United States Patent
Otsuki et al.

(10) Patent No.: US 7,470,291 B2
(45) Date of Patent: Dec. 30, 2008

(54) PRODUCTION PROCESS OF CERAMIC ELECTRONIC COMPONENT

(75) Inventors: Jun Otsuki, Hokkaido (JP); Atsuo Nagai, Osaka (JP)

(73) Assignee: Panasonic Corporation, Osaka (JP)

( * ) Notice: Subject to any disclaimer, the term of this patent is extended or adjusted under 35 U.S.C. 154(b) by 406 days.

(21) Appl. No.: 10/567,436

(22) PCT Filed: Jul. 13, 2004

(86) PCT No.: PCT/JP2004/010280

§ 371 (c)(1),
(2), (4) Date: Feb. 7, 2006

(87) PCT Pub. No.: WO2005/015589

PCT Pub. Date: Feb. 17, 2005

(65) Prior Publication Data

US 2006/0205210 A1   Sep. 14, 2006

(30) Foreign Application Priority Data

Aug. 7, 2003   (JP) ............................. 2003-288723

(51) Int. Cl.
*H01G 9/00* (2006.01)
(52) U.S. Cl. .................................... 29/25.03
(58) Field of Classification Search ............ 29/25.03
See application file for complete search history.

(56) References Cited

U.S. PATENT DOCUMENTS

| 5,889,647 | A  | * | 3/1999  | Hansen et al. ............. 361/311 |
| 2006/0266983 | A1 | * | 11/2006 | Suzuki et al. .............. 252/500 |
| 2007/0223177 | A1 | * | 9/2007  | Ito et al. ................ 361/321.2 |
| 2008/0061263 | A1 | * | 3/2008  | Kawada et al. ........ 252/62.9 PZ |

FOREIGN PATENT DOCUMENTS

| JP | 6-349673 A    | 12/1994 |
| JP | 9-318339 A    | 12/1997 |
| JP | 2002-168897 A | 6/2002  |

* cited by examiner

*Primary Examiner*—Jack Chen
(74) *Attorney, Agent, or Firm*—McDermott Will & Emery LLP (57) ABSTRACT

At least one conductive layer is formed by applying paste mainly containing metal on at least one insulating sheet. At least one sintered body is provided by firing the at least one insulating sheet having the at least one conductive layer formed thereon. The amount of the metal contained in the at least one conductive layer of the at least one sintered body is detected. A sintered body is selected from the at least one sintered body based on the detected amount of the metal. An outer electrode is formed on the selected sintered body, thus providing a ceramic electronic device. This method allows a defective to be detected in an early stage of manufacturing processes, hence providing a ceramic electronic device to be manufactured efficiently.

11 Claims, 8 Drawing Sheets

| Sample No. | Thickness of Nickel Layer (μm) | Amount of Metal At Printing (mg/cm²) | Induced Voltage (V) | | | Capacitance (μF) |
|---|---|---|---|---|---|---|
| | | | Ceramic Sheet | Laminated Body | Sintered Body | |
| 1 | 0.5 | 0.245 | 0.1203 | 0.1207 | 0.1267 | 0.01 |
| 2 | 1.0 | 0.505 | 0.2486 | 0.2488 | 0.2562 | 0.85 |
| 3 | 1.4 | 0.705 | 0.3470 | 0.3473 | 0.3612 | 1.02 |
| 4 | 1.8 | 0.911 | 0.4491 | 0.4489 | 0.4713 | 1.10 |
| 5 | 2.4 | 1.215 | 0.5988 | 0.5986 | 0.6225 | 1.11 |

PRODUCTION PROCESS OF CERAMIC ELECTRONIC COMPONENT

RELATED APPLICATION

This application is the U.S. National Phase under 35 U.S.C. § 371 of International Application No. PCT/JP2004/010280, filed on Jul. 13, 2004, which in turn claims the benefit of Japanese Application No. 2003-288723 filed on Aug. 7, 2003, the disclosures of which Applications are incorporated by reference herein.

FIELD OF THE INVENTION

The present invention relates to a method of manufacturing ceramic an electronic-device, such as a laminated ceramic capacitor.

BACKGROUND OF THE INVENTION

Figure 5A:
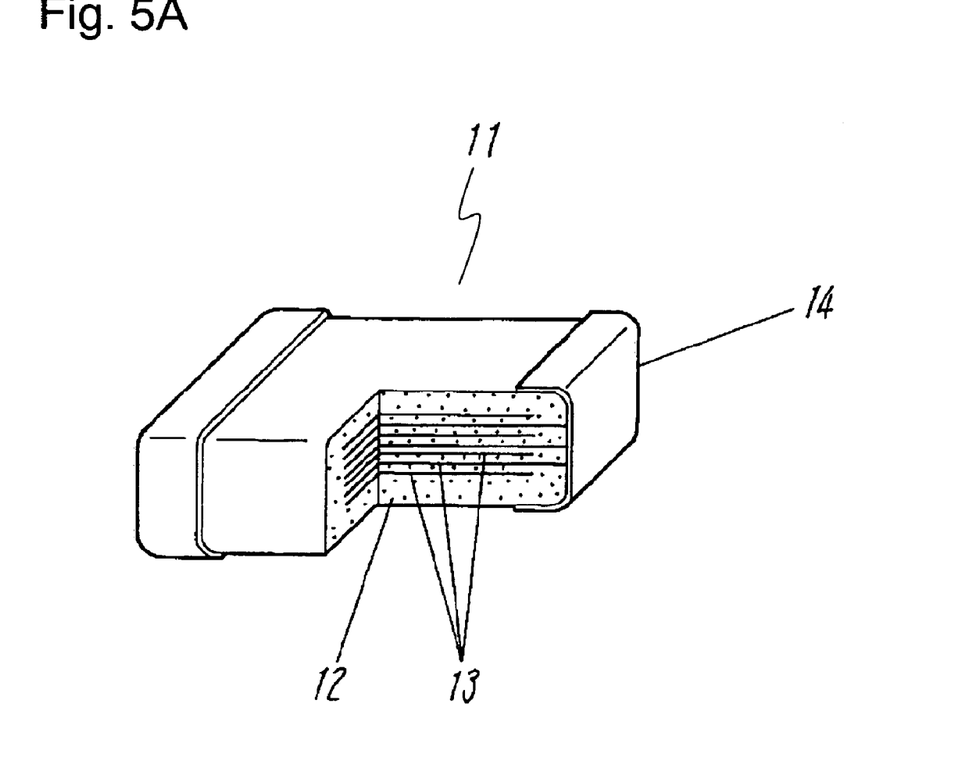
FIG. 5A is a partially cut-off perspective view of a laminated ceramic capacitor, a ceramic electronic device.
Figure 5B:
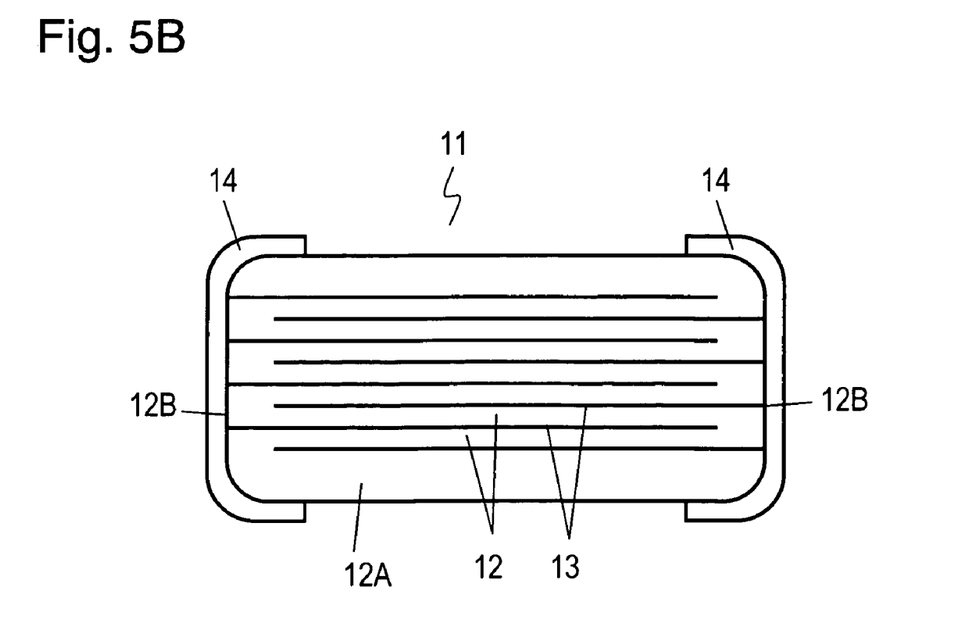
FIG. 5B is a sectional view of the laminated ceramic capacitor.

A conventional method of manufacturing laminated ceramic capacitor 11, a laminated ceramic electronic device, will be described below. FIG. 5A is a partially cut-out perspective view of laminated ceramic capacitor 11. FIG. 5B is a sectional view of capacitor 11. Dielectric layers 12 and inner electrodes 13 are stacked alternately, thus providing laminated body 12A. Edges of inner electrodes 13 expose alternately at end surfaces 12B of laminated body 12A opposite to each other, and are connected alternately to outer electrodes 14 formed on both end surfaces 12B.

A conventional method of manufacturing laminated ceramic capacitor 11 disclosed in Japanese Patent Laid-Open Publication No. 2002-168897 will be described below.

Figure 9:
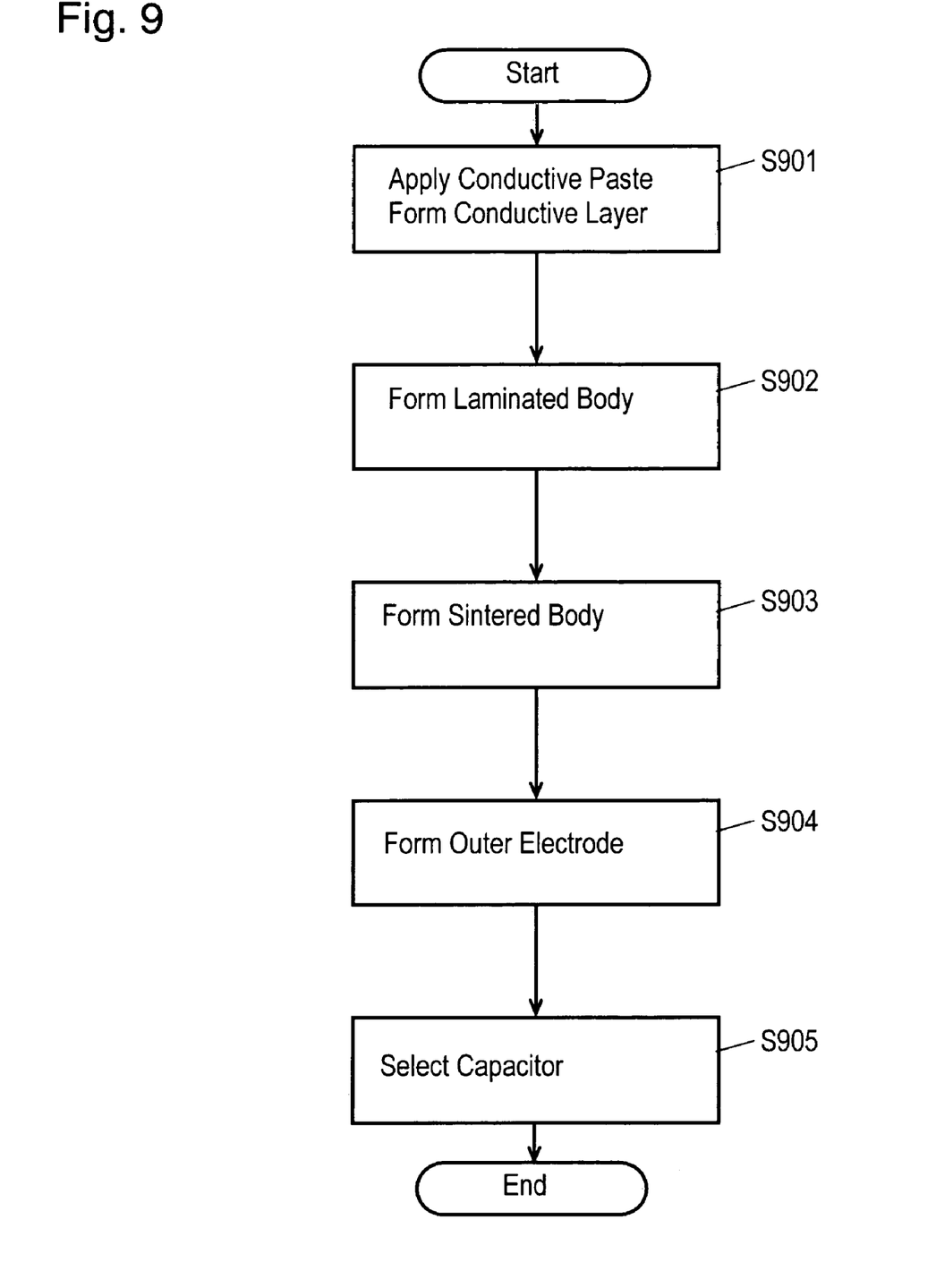
FIG. 9 is a flowchart illustrating a conventional method of manufacturing a ceramic electronic device.

FIG. 9 is a flowchart illustrating the conventional method of manufacturing the ceramic electronic device.

Ceramic dielectric powder made mainly of barium titanate is mixed with binder, plasticizer, and solvent, thus providing slurry (paste). The slurry (paste) is shaped into plural ceramic sheets which are to be dielectric layers 12. Conductive paste, which provides inner electrodes 13, containing metal is printed on the sheets, thus providing conductive layers (step S901). The sheets are stacked, providing a laminated body (step S902). The laminated body, i.e., the sheets and the conductive paste, are fired together at 1200° C. to 1300° C., thus providing sintered laminated body (sintered body) 12A (step S903). Then, outer electrodes 14 are formed, thus providing laminated ceramic capacitor 11. Capacitor 11 thus provided are selected according to characteristics, such as a capacitance and a dielectric loss, before its shipment (step S905).

The capacitance of capacitor 11 depends largely on a printing situation of the conductive paste providing inner electrode 13. That is, the conductive paste including a large amount of metal provides a large capacitance, and the conductive paste including a small amount of the metal provides a small capacitance. The capacitance is measured generally after capacitor 11 is provided. Hence, while a defective of the capacitance caused by the amount of the metal is produced during the printing of the conductive paste, the defective is found after the final process of manufacturing capacitor 11. This defective accordingly reduces the efficiency of the manufacturing of capacitors 11.

SUMMARY OF INVENTION

At least one conductive layer is formed by applying paste mainly containing metal on at least one insulating sheet. At least one sintered body is provided by firing the at least one insulating sheet having the at least one conductive layer formed thereon. The amount of the metal contained in the at least one conductive layer of the at least one sintered body is detected. A sintered body is selected from the at least one sintered body based on the detected amount of the metal. An outer electrode is formed on the selected sintered body, thus providing a ceramic electronic device.

This method allows a defective to be detected in an early stage of manufacturing processes, hence providing a ceramic electronic device to be manufactured efficiently.

DETAILED DESCRIPTION OF THE PREFERRED EMBODIMENT

Figure 1:
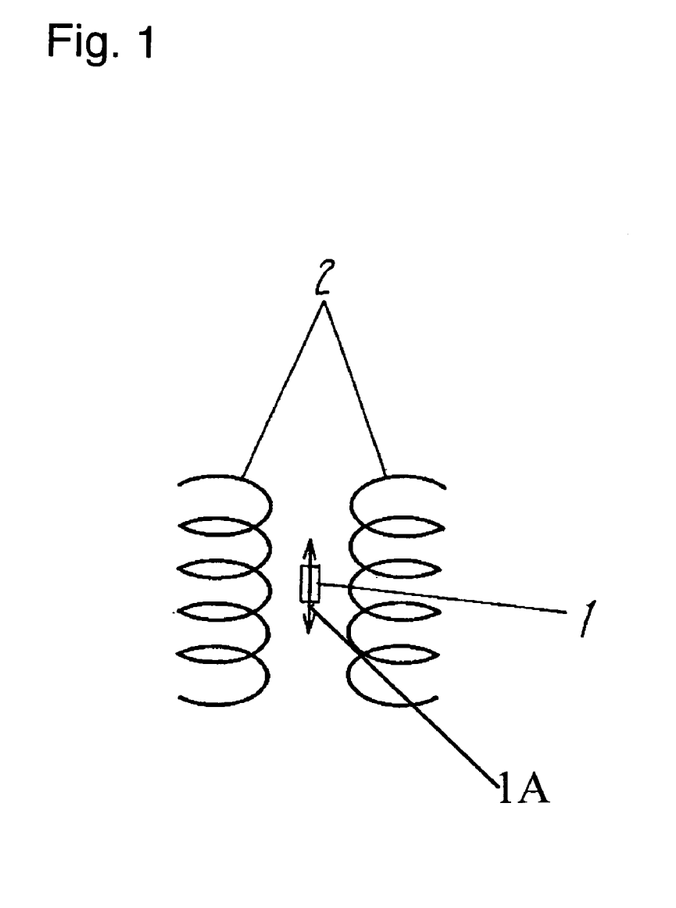
FIG. 1 is a schematic diagram illustrating a method of manufacturing a ceramic electronic device in accordance with an exemplary embodiment of the present invention.

FIG. 1 is a schematic diagram for illustrating a method of manufacturing a ceramic electronic device in accordance with an exemplary embodiment of the present invention. Sample 1 containing metal is held between coils 2, i.e. near coils 2. Causing sample 1 to vibrate in direction 1A produces a voltage induced on coils 2. A vibrating-sample magnetometer is used for this kind of measuring.

FIGS. 5A and 5B are a perspective view and a sectional view of a laminated ceramic capacitor in accordance with this embodiment, respectively. A method of manufacturing the capacitor shown in FIGS. 5A and 5B will be described in detail below.

Plural ceramic sheets having thicknesses of 5 µm, mainly containing barium titante, and further containing binder and plasticizer were formed. These ceramic sheets were insulating sheets made of dielectric material and were used as dielectric layer 12. Then, nickel paste containing nickel powder of 0.2 µm, metal, was printed on the ceramic sheets, providing conductive layers which are to be inner electrodes 13. As samples 1 to 5 of capacitor 11, conductive layers having thicknesses of 0.5 µm, 1.0 µm, 1.4 µm, 1.8 µm, and 2.4 µm were produced and contained 0.245 mg/cm$^2$, 0.505 mg/cm$^2$, 0.705 mg/cm$^2$, 0.911 mg/cm$^2$, and 1.215 mg/cm$^2$ of the metal, respectively.

Next, ten ceramic sheets having conductive layers having thicknesses identical to each other were stacked and bonded by thermo-compression, thus providing a laminated body. Then, the laminated body was cut into chips having a size of 3.2 mm by 1.6 mm. The chips of the laminated body were fired at 1250° C. in the atmosphere where nickel was not oxidized, thus providing sintered body 12A. Then, copper paste was applied on both end surfaces 12B of sintered body 12A, was baked at 800° C. in nitrogen, and was plated with nickel and tin as to form outer electrodes 14, thus providing samples 1 to 5 of laminated ceramic capacitor 11.

Samples 1 to 5 were held and caused to vibrate between coils 2, i.e., near coils 2, and voltages induced on coils 2 are measured.

Five ceramic sheets having the same nickel paste as that of samples 1 to 5 printed thereon were cut out into pieces having areas identical to the areas of inner electrodes 13. Then, similarly, the pieces were held and caused to vibrate between coils 2 at a room temperature, and the induced voltages were measured. At this moment, a mounting position, a direction, and the sizes of the samples were considered to provide accurate measurement.

The capacitances of the samples 1 to 5 at 1 kHz were measured with an LCR meter at 25° C.

Figure 2:
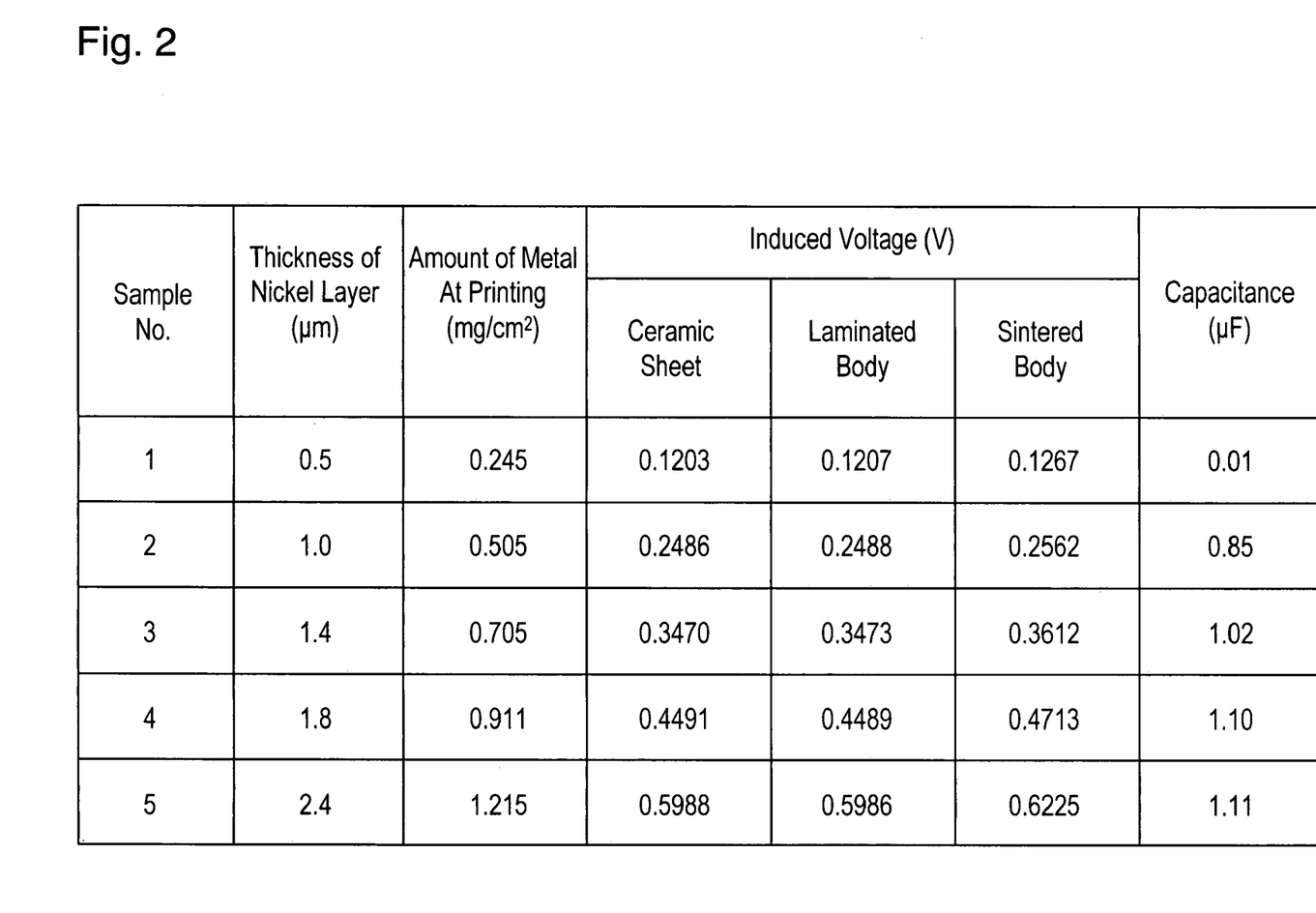
FIG. 2 shows a capacitance of the ceramic electronic device in accordance with the embodiment.

FIG. 2 shows the voltages induced on coil 2 with the sheets before the lamination, the induced voltages with the sheets after the lamination, the induced voltages with the sheets laminated and sintered, and the capacitances of the laminated ceramic capacitors.

As shown in FIG. 2, the thinner the conductive layers are, the smaller the induced voltage and the capacitances are. The conductive layer having the thickness of 0.5 µm does not provide a normal capacitance. If the conductive layer is thin, the nickel may be formed with defects during the firing, so that the conductive layer cannot have a large area, which is an important factor to provide a capacitance. Thus, the thin conductive layer may provide a small capacitance.

The thicker the conductive layer is, the larger the induced voltages and the capacitance are. However, if the layer is excessively thick, delamination may occur in the sintered body, and the laminated body may become unpreferably thick.

As discussed above, the induced voltages are measured for either the laminated body or the sintered body, thereby allowing the capacitance to be detected easily.

The amount of the nickel is not stable due to dispersion of printing accuracy, variation of the firing temperature as well as the firing atmosphere. The induced voltage of each laminated body or each sintered body is measured, and thereby, defectives are detected before the capacitors are completed, thus allowing the capacitors to be manufactured efficiently.

More than several tens of thousand pieces of general components, such as the laminated ceramic capacitors, are often manufactured as a single lot. In the manufacturing method according to this embodiment, not all of the capacitors of the lot are inspected. However, several pieces or several tens of pieces are selected from the lot for inspection to be measured in the induced voltages for the laminated body or the sintered body. This operation enables the capacitors of each lot to be selected based on the induced voltages, thus allowing the capacitors to be manufactured efficiently.

Figure 3:
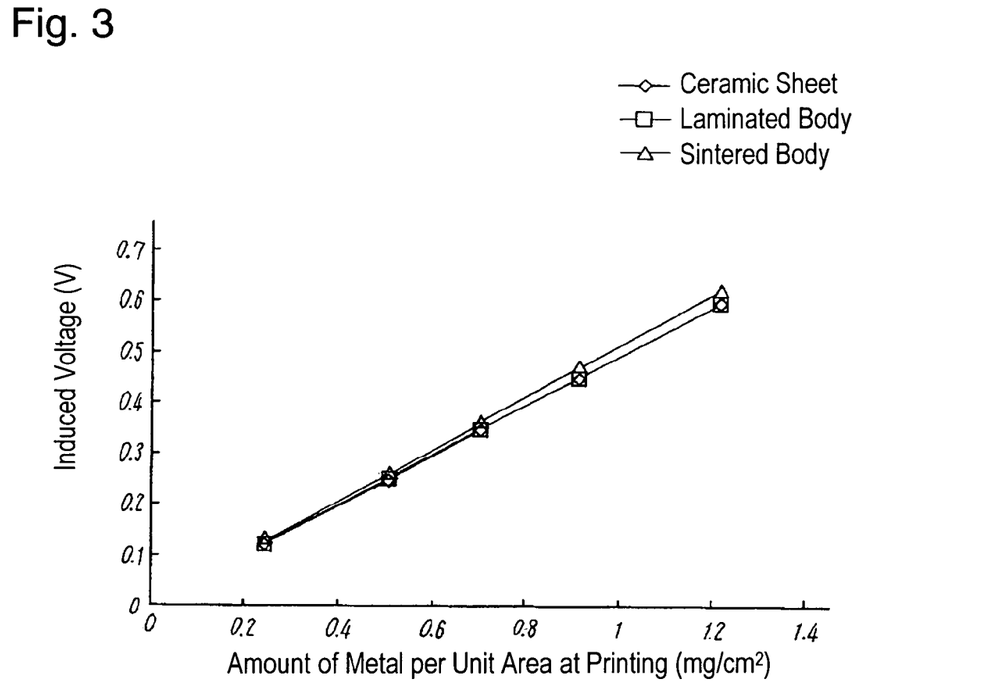
FIG. 3 shows relations between an inducted voltage and a amount of metal per unit area of an inner electrode of the ceramic electronic device in accordance with the embodiment.

FIG. 3 shows relations between the induced voltages and amounts of metal per unit area of the sheets, laminated bodies, and the sintered bodies of samples 1 to 5 shown in FIG. 2.

Figure 4:
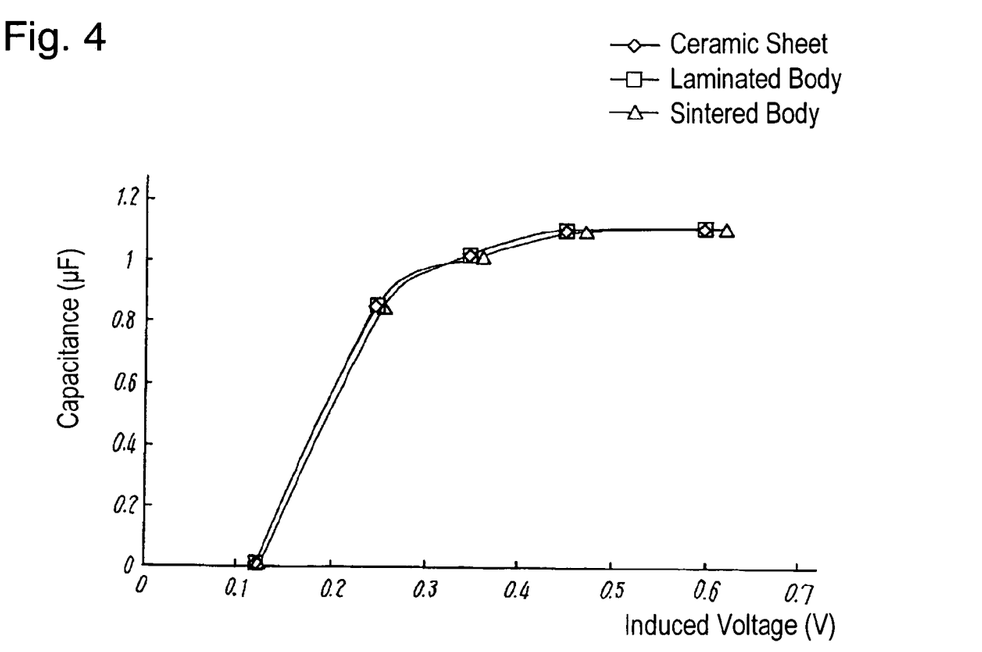
FIG. 4 shows relations between an inducted voltage and a capacitance of the ceramic electronic device in accordance with the embodiment.

FIG. 4 shows relations between the induced voltages and the capacitances of samples 1 to 5.

As shown in FIG. 3, the capacitances of the capacitors can be estimated based on the voltage induced on coil 2.

FIG. 4 can be used as calibration curves for estimating the capacitance based on the induced voltage.

Similarly to above, ten ceramic sheets each including a conductive layer having a thickness of 1.2 µm provided by printing conductive paste containing nickel were stacked and bonded by thermo-compression, thus providing a laminated body. This laminated body was cut into pieces having sizes of 3.2 mm by 1.6 mm, and then fired at 1250° C., providing sintered bodies to provide samples of 10 lots.

The samples of 10 lots were measured in the induced voltages for both the pieces of the laminated body before the firing and the sintered bodies after the firing. Then, the capacitances of the samples were estimated by using the calibration curves shown in FIG. 4. One lot exhibiting small capacitances was found out, and the other nine lots exhibited capacitances within a target range.

For the samples of the 10 lots, copper paste was applied on both the end surfaces of the sintered bodies, baked at 800° C. in nitrogen, and plated with nickel and tin as to provide the outer electrodes. Then, the capacitances of the samples were measured as the final selecting process.

As a result, as estimated based on the induced voltages, the lot exhibited small capacitances, and the other nine lots exhibited target capacitances. This result matches the estimation based on the induced voltages.

As discussed above, in the manufacturing method in accordance with this embodiment, electrical defectives caused by the amount of the metal can be found not in the final selecting process but in an early stage of the manufacturing processes.

The firing may oxidize the metal partially, or have the metal react with ceramic. Therefore, even if the amount of the conductive paste at the printing does not change, the amount of the metal may vary, thus causing the capacitances to vary. The measurement of the induced voltages both before and after the firing of the laminated body allows the sintered bodies to be selected accurately.

The amount of the metal has been estimated conventionally by measuring the weight of a ceramic sheet before and after having a conductive layer printed thereon to detect the weight of the printed conductive paste. However, this method may provide variation of the measurement of the amount of the metal since the amount of the metal contained in the conductive paste varies and a printing situation may vary.

In the method in accordance with this embodiment, the amount of the metal is measure based on the induced voltage, hence being measured easily and accurately. Before providing the laminated body, a ceramic sheet having a conductive paste applied thereon may be caused to vibrate near the coils to measure the voltages induced on the coils. Then, the ceramic sheets can be selected based on the induced voltages. This method allows defective ceramic sheets to be screened more securely than the conventional method. The status of the defectives may be fed back to stabilize the amount of the metal contained in the conductive layer.

The amount of the metal contained in each sintered body can be measured by dissolving ceramic in the sintered body in acid and measuring the weight of metal remaining. However, this method is a kind of destructive inspection, which needs tremendous time and labor, so that it cannot be employed as a selecting process in the manufacturing processes. Thus, the method in accordance with this embodiment, in which the amount of the metal in the conductive layer is detected indirectly based on the induced voltage before an outer electrode is formed to select capacitors, is effective as a selecting process in the manufacturing processes.

Figure 6:
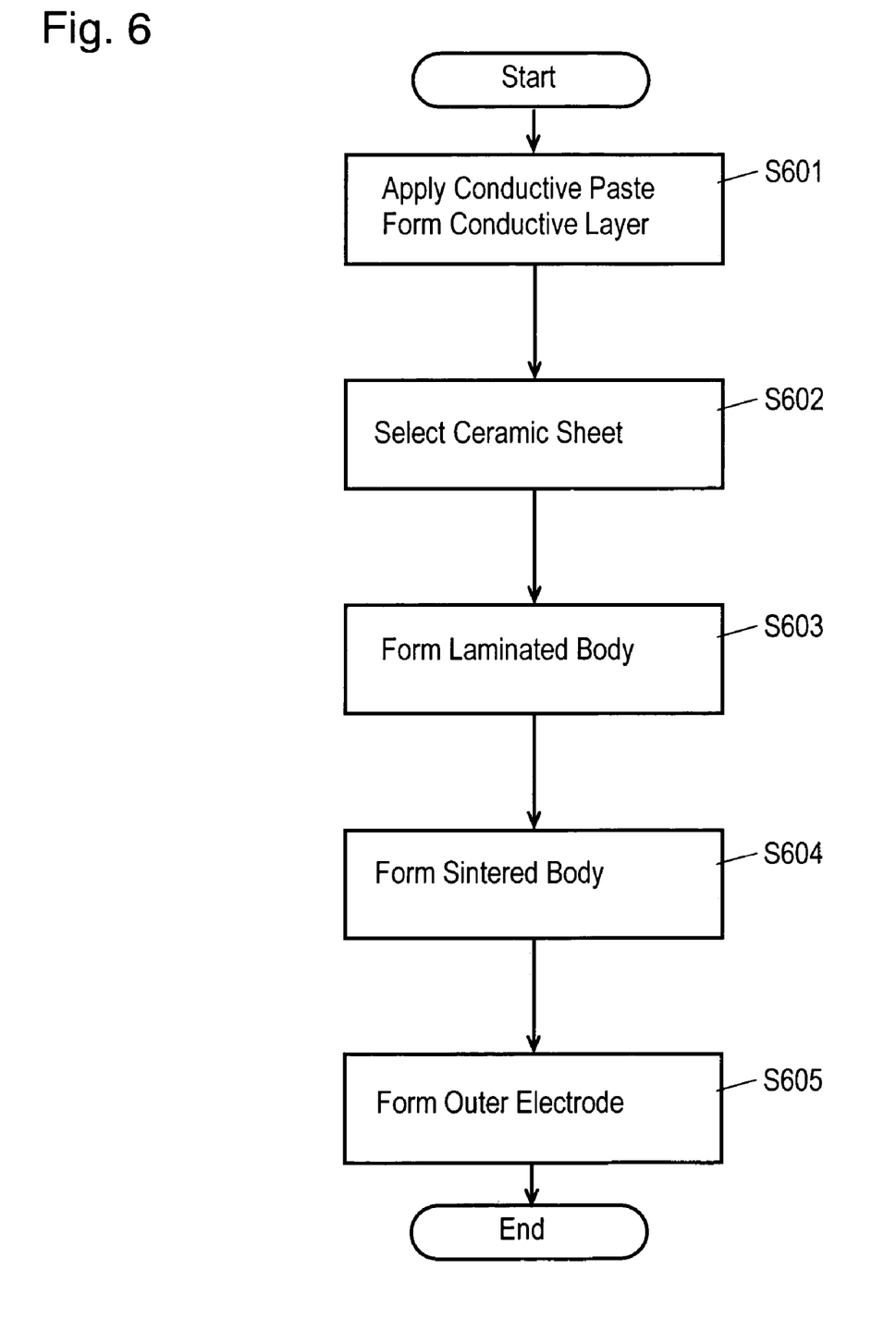
FIG. 6 is a flowchart illustrating a method of manufacturing the ceramic electronic device in accordance with the embodiment.
Figure 7:
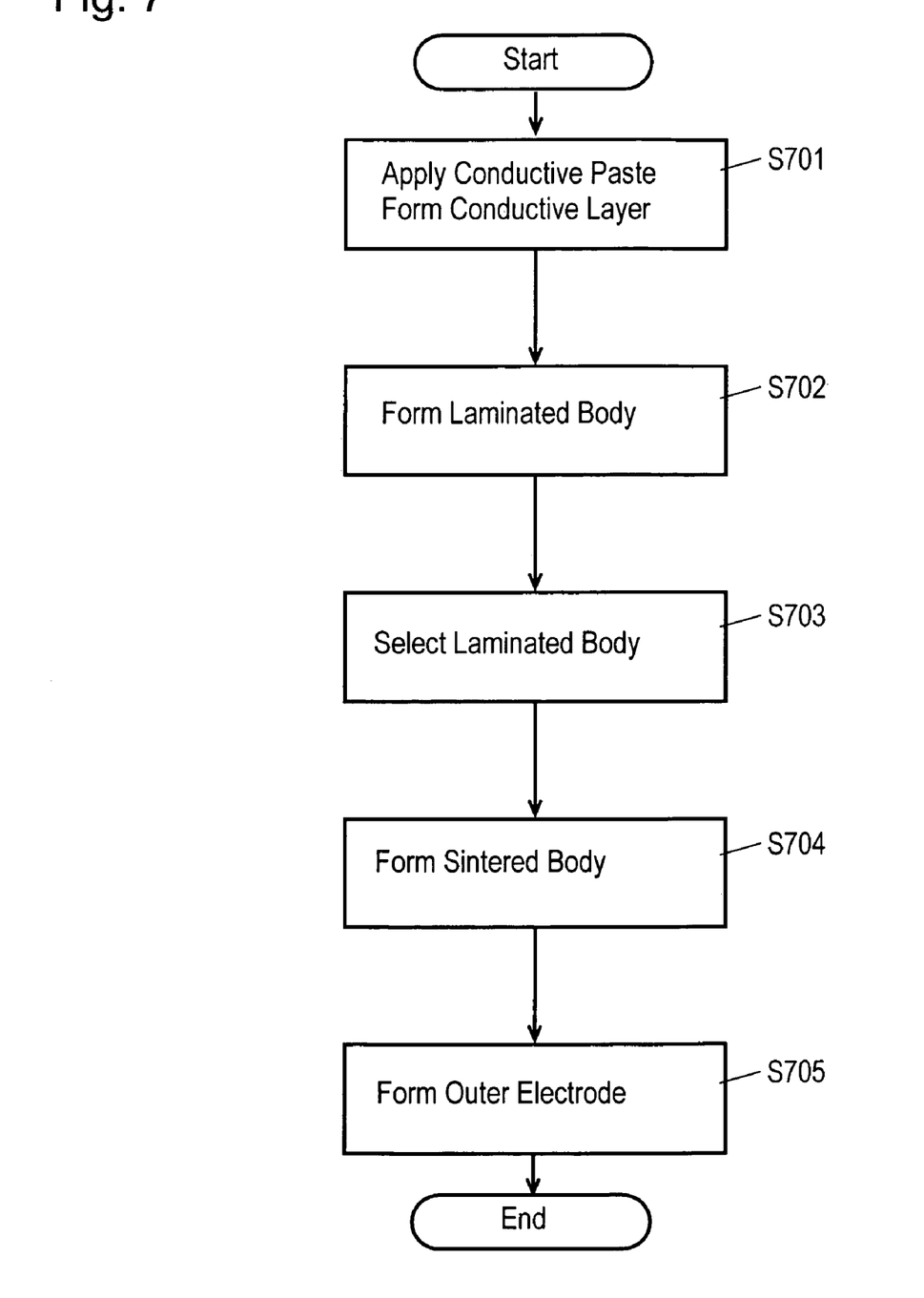
FIG. 7 is a flowchart illustrating another method of manufacturing the ceramic electronic device in accordance with the embodiment.
Figure 8:
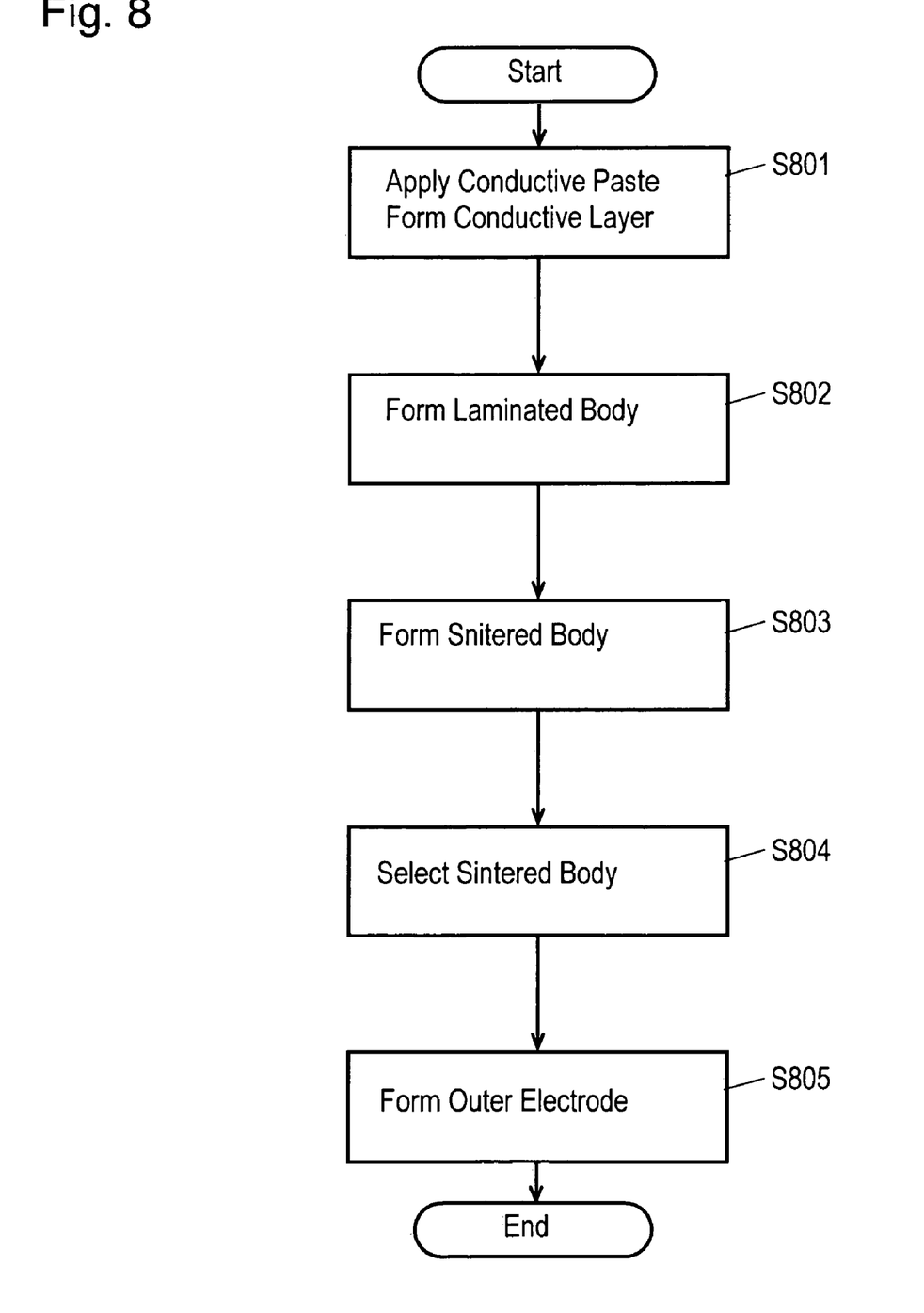
FIG. 8 is a flowchart illustrating still another method of manufacturing the ceramic electronic device in accordance with the embodiment.

FIGS. 6 to 8 are flowcharts illustrating the method of manufacturing the ceramic electronic device according to this embodiment based on the above.

First, the method shown in FIG. 6 will be described below. Conductive paste is applied on ceramic sheets for forming conductive layers (step S601). The ceramic sheets each having the conductive layer formed thereon are selected based on the voltages induced on coils 2 (S602). A laminated body is formed with the selected sheets (S603). The laminated body is baked for forming a sintered body (S604). An outer electrode is formed on the sintered body, thus providing the capacitor. As discussed above, the selecting can be carried out not only once step but also plural times through steps S601 to S604, thereby allowing the capacitor to be selected more accurately.

Next, the manufacturing method shown in FIG. 7 will be described below. Conductive paste is applied on a ceramic sheet for forming a conductive layer (step S701). Laminated bodies are formed by using the ceramic sheets each having the conductive layer formed thereon (S702). The laminated bodies are selected based on the voltages induced on coils 2 (S703). The selected laminated body is fired for forming the sintered body (S704). An outer electrode is formed on the sintered body, thus providing the capacitor. As discussed above, the selecting can be carried out not only once but also plural times through steps S701 to S704, thereby allowing the capacitor to be selected more accurately.

Next, the manufacturing method shown in FIG. 8 will be described below. Conductive paste is applied on a ceramic sheet for forming a conductive layer (step S801). Laminated bodies are formed by using the ceramic sheets each having the conductive layer formed thereon (S802). The laminated bodies are fired for forming sintered bodies (S803). The sintered bodies are selected based on voltages induced on coils 2 (S804). An outer electrode is formed on the selected sintered body, thus providing a capacitor. As discussed above, the selecting can be carried out not only once but also plural times through steps S801 to S804, thereby allowing the capacitor to be selected more accurately.

The manufacturing methods shown in FIGS. 6 to 8 are different from the conventional method shown in FIG. 9 in that a capacitor is selected based on the amount of metal in the conductive layer before the outer electrode is formed. Thus, those methods can eliminate an unnecessary process of forming an outer electrode on a defective capacitor.

According to this embodiment, the methods of manufacturing laminated ceramic capacitors as a ceramic electronic device are described. According to this embodiment, the same effects are provided for laminated ceramic electronic devices each having a conductive layer containing magnetic metal.

The ceramic sheet, i.e. an insulating sheet, in accordance with the embodiment may be a base film made of insulating material, such as resin, e.g. polyethylene terephthalate (PET) film.

INDUSTRIAL APPLICABILITY

In a method of manufacturing a ceramic electronic device according to the present invention, the amount of metal contained in a conductive layer used in the ceramic electronic device is measured. Thereby, this method detects defectives at an early stage of manufacturing processes, thus allowing the ceramic electronic device to be manufactured efficiently.

The invention claimed is:

1. A method of manufacturing a ceramic electronic device, comprising:
   forming at least one conductive layer by applying paste mainly containing metal on at least one insulating sheet;
   providing at least one sintered body by firing the at least one insulating sheet having the at least one conductive layer formed thereon;
   detecting an amount of the metal contained in the at least one conductive layer of the at least one sintered body;
   selecting a sintered body from the at least one sintered body based on the detected amount of the metal; and
   forming an outer electrode on the selected sintered body.

2. The method of claim 1, wherein said detecting an amount of the metal contained in the at least one conductive layer of the at least one sintered body comprises:
   causing the at least one sintered body to vibrate near a coil;
   measuring a voltage induced on the coil; and
   detecting the amount of the metal contained in the at least one conductive layer based on the measured inducted voltage.

3. The method of claim 1, further comprising
   forming at least one laminated body by using the at least one insulating sheet having the at least one conductive layer formed thereon,
   wherein said providing at least one sintered body by firing the at least one insulating sheet having the at least one conductive layer formed thereon comprises providing the at least one sintered body by firing the at least one laminated body.

4. The method of claim 1, wherein the metal comprises nickel.

5. The method of claim 1, wherein the insulating sheet comprises a ceramic sheet.

6. The method of claim 1, wherein the insulating sheet comprises a base film made from insulating material.

7. A method of manufacturing a ceramic electronic device, comprising:
   forming at least one conductive layer by applying paste mainly containing metal on at least one insulating sheet;
   providing at least one sintered body by firing the at least one insulating sheet having the at least one conductive layer formed thereon;
   causing the at least one sintered body to vibrate near a coil;
   measuring a voltage induced on the coil; and
   selecting, based on the measured induced voltage, a sintered body from the at least one sintered body; and
   forming an outer electrode on the selected sintered body.

8. The method of claim 7, further comprising
   forming at least one laminated body by using the at least one insulating sheet having the at least one conductive layer formed thereon,
   wherein said providing the at least one sintered body by firing the at least one insulating sheet having the at least one conductive layer formed thereon comprises providing the at least one sintered body by firing the at least one laminated body.

9. The method of claim 7, wherein the metal comprises nickel.

10. The method of claim 7, wherein the insulating sheet comprises a ceramic sheet.

11. The method of claim 7, wherein the insulating sheet comprises a base film made from insulating material.

* * * * *